April 7, 1942.  B. SVIRSKY  2,279,257
EXPANSIBLE CLOSURE MEANS FOR CONDUITS
Filed Feb. 11, 1941
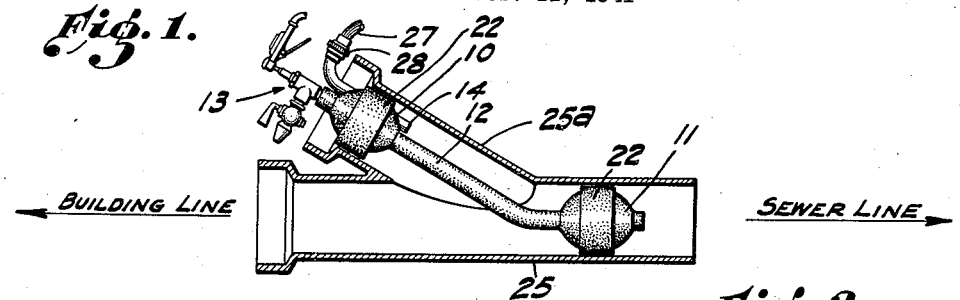
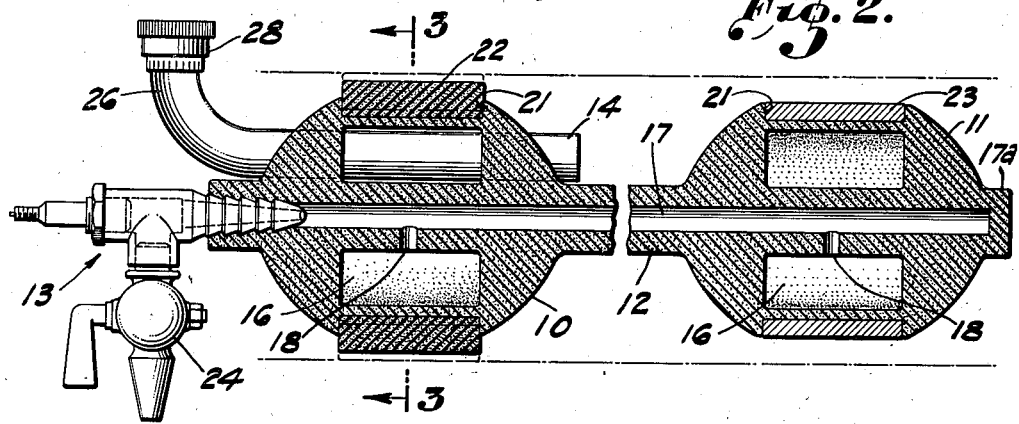
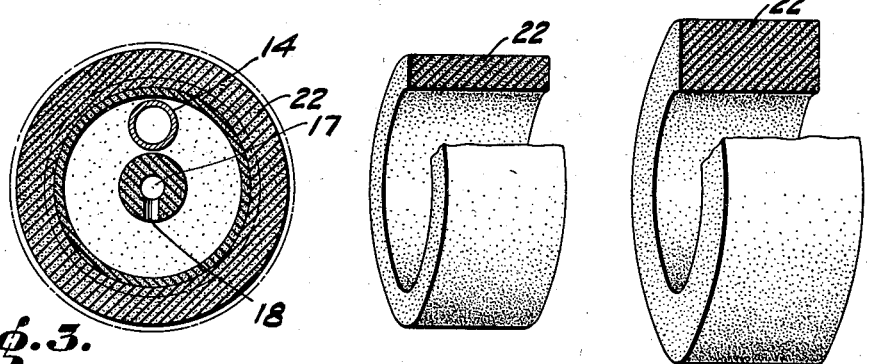 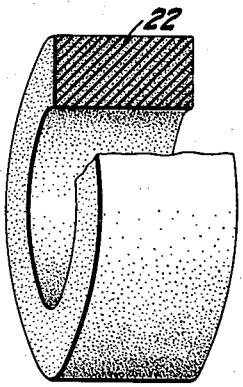
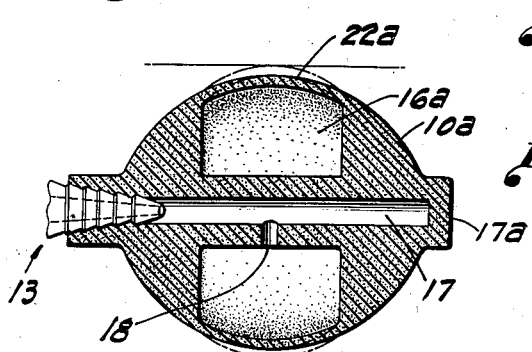
BENNETT SVIRSKY,
INVENTOR.
BY 
ATTORNEY.

Patented Apr. 7, 1942

2,279,257

UNITED STATES PATENT OFFICE 2,279,257

EXPANSIBLE CLOSURE MEANS FOR CONDUITS

Bennett Svirsky, Glendale, Calif., assignor of one-half to Charles W. Sievert

Application February 11, 1941, Serial No. 378,381

6 Claims. (Cl. 138—90)

The present invention relates to improvements in expansible closure means for conduits and is particularly well adapted for use by plumbers in testing to detect leaks.

Regulations in force today require that plumbing installations be tested to detect leaks if present. For a better attainment of this end it is desirable to insert into the pipe line a pneumatically expansible plug which will form a closure therein and permit filling the pipe line closed thereby in order to determine if any leaks are present.

Usually the pipe line comes equipped with the necessary plumbing fixtures such as T's and Y's for making these leak inspections, and in order to plug the main line as well as the branch line, it is necessary for the connection between the two plugs to be flexible and of the required length.

One of the principal objects of the invention is to provide improved means capable of pneumatic expansion into a sealing engagement with the pipe line to restrain the flow of liquid entrapped thereby, and to construct as a unit the expansible means and a conduit by which air is entrained thereinto.

Another object of the invention is to provide a device of the above named character constructed solely of an elastic substance integralized as a single body.

Another object of the invention is to provide interchangeable circumferentially expandible means to accommodate the plugging and sealing of pipe lines varying in diameter.

Still another object of the invention is to provide, in an elastic double globular plug construction, a plurality of rings applicable to the plugs along their zones of greatest diameter, certain of said rings being elastic, and others being nonelastic.

Among other objects of the invention are to provide a superior, simplified air conduit means for connecting together in series a plurality of elastic bodies expandible by air supplied from said conduit to cause them to function as temporary liquid tight plugs within sewer or other pipes; and to provide, for temporarily plugging up conduits, a body surrounded by an elastic diaphragm which responds quickly and effectively to internal air pressure to produce the desired liquid tight seal.

With the foregoing and other objects in view, the invention resides in the novel arrangement and combination of parts and in the details of construction hereinafter described and claimed, it being understood that changes in the precise embodiment of the invention herein disclosed may be made within the scope of that which is claimed without departing from the spirit of the invention.

Referring to the accompanying drawing, which illustrates what are at present deemed to be preferred embodiments of the invention, Fig. 1 is a side elevation of the complete device in one of its operative positions, showing the same inside of a sectioned Y-shaped sewer pipe section.

Fig. 2 is a longitudinal mid-section on a larger scale than Fig. 1 of the expandible part of the device, an intermediate portion thereof being broken away in order to contract the length of the view, certain parts thereof being shown in side elevation. In this view dotted lines indicate the expanded condition of one of the expansible bodies.

Fig. 3 is a cross section on line 3—3 of Fig. 2.

Figs. 4 and 5 are respectively perspective, broken views of the smaller and larger types of elastic rings used to fit sewer pipes of standard diameters.

Fig. 6 is a longitudinal mid section of a modification of one expandible closure member.

Describing first the embodiment of the invention shown in Figs. 1 to 5, the principal parts thereof are the expandible bodies 10 and 11 joined by means of a flexible conduit 12, a pressure supply fitting 13 to supply the expanding fluid, ordinarily air, and a tube 14 to supply the water used to test the sewer pipe and conduits communicating with it to determine whether or not leaks are present.

Said bodies 10 and 11, by preference and as shown are of a generally globular shape, but each has one axis somewhat the longest, such axis alining with the axis of the conduit 12 which connects them. Said bodies are shown similarly constructed, each being made of a rubber or rubber-like substance, and each having an annular, concentrically located air chamber 16 which communicates with the axial supply passage 17 by means of a duct 18.

In order to provide for it a more sturdy, durable peripheral sealing member the body 10 has extending around it a broad channel 21 into which is fitted a sealing ring 22 which is expandible but is composed of a denser rubber or rubber-like material. Underlying each channel 22 the comparatively thin wall around each annular air chamber 16 forms an elastic diaphragm which swells out under the air chamber pressure, and, in turn urges the ring 22 into an expanded condition to perform its sealing function when the device is in its operative position.

At times it will be necessary to prevent the body 11 from expanding into a sealing relation to a conduit into which it is inserted. In such instances a ring 23 of non-expandible material, such, for example, as brass will be seated within the channel 21 of the body 11.

In Fig. 1 the device is shown positioned for operation within a Y having a body portion 25 and an upwardly inclined branch 25a. After the bodies 10 and 11 have been expanded by compressed air supplied from the fitting 13 water will be supplied to the building line (indicated by the arrow at the left of Fig. 1) to test as to the presence or absence of leaks.

Preparatory to putting the device into operation in a situation like that shown in Fig. 1, expansible rings of the proper sizes will be fitted into the channels 21 of the bodies 10 and 11 before air pressure is supplied to said bodies. Then, after positioning the device as shown, air from a pressure supply or from an air pump will be supplied to the device through the fitting 13, already mentioned, which may consist of a conventional air valve structure, except that it is furnished with a pet cock 24 through which the air may be more quickly discharged.

In some situations it may be found necessary to supply water from a specially provided source to the section of a sewer pipe or other conduit located at the side of the body 10 farthest from its fitting 13. For this purpose metal pipe 14 is vulcanized into place as shown, said pipe having a deflected intake end portion 26 to which a hose 27 may be connected by means of a coupling 28.

As viewed in Fig. 2 the right end of the passage 17 is closed by a boss 17a with which the body 11 is provided. The opposite end of said passage is open to receive the fitting 13.

If the device is to be used only in situations where it is not necessary to flex the portion 12, a metal pipe having the end opposite to the connection 13 closed may be substituted for the said portion 12, said bodies being vulcanized in place around said pipe and the latter being furnished with suitable apertures to communicate with the chambers 16.

Before the air pressure is supplied to the interiors of the bodies 10 and 11 the rings 22 and 23 may be easily slipped into place around them, because at such time said shoulders may be readily compressed, but after the air pressure has been supplied the shoulders at each side of the channels 21 become sufficiently rigid to form a dependable retaining means for said rings.

In Fig. 6 is shown a modification of the sealing body 10a, wherein the annular air chamber 16a is made of greater radial dimensions and is surrounded by a comparatively thin peripheral sealing wall 22a which comes into a direct sealing contact with the inner surface of the tubular member within which the liquid tight closure is to be temporarily provided.

What I claim is:

1. In a device of the kind described, a globular body of elastic material, said body having within it an air chamber encircled by a diaphragm, there being a channel extending around said body, the bottom of said channel being formed by said diaphragm, said body also having a pair of annular shoulders extending around it and facing each other, said shoulders forming the side walls of said channel, means to supply air under pressure to said air chamber to bulge outwardly said diaphragm, and a manually detachable elastic ring occupying said channel and expandible under the urge of pressure from said diaphragm into a fluid tight fit in relation to a conduit having an internal diameter somewhat greater than the normal external diameter of said ring.

2. The subject matter of claim 1 and, said air supply means including a passage leading axially into said body and having a branch passage communicating with said air chamber.

3. In a device of the kind described, two globular bodies of elastic material connected in series by a conduit, said bodies having within them an air chamber encircled by a diaphragm, there being a channel extending around said bodies, the bottoms of said channels being formed by said diaphragms, said bodies also each having a pair of annular shooulders extending around it and facing each other, said shoulders forming the side walls of said channels, means to supply air under pressure to said air chambers to bulge outwardly said diaphragms, and a manually detachable elastic ring occupying each said channel and expandible under the urge of pressure from said diaphragms into a fluid tight fit in relation to a conduit having an internal diameter somewhat greater than the normal external diameter of said rings.

4. Elastic globular bodies connected in series by a conduit, each said body having within it an air chamber encircled by a diaphragm, there being a channel extending around each said body, the bottom of each said channel being formed by a said diaphragm, each said body also having a pair of annular shoulders extending around it and facing each other, said shoulders forming the side walls of each said channel, a manually detachable elastic ring occupying the channel of one body, and a manually detachable inelastic ring occupying the channel of the other body.

5. The subject matter of claim 4 and, said elastic ring being expandible under the urge of pressure from its associated diaphragm into a fluid tight fit in relation to a conduit having an internal diameter somewhat greater than its own normal external diameter.

6. In a device of the kind described, a globular body of elastic material, said body having within it an air chamber encircled by a diaphragm, there being a channel extending around said body, the bottom of said channel being formed by said diaphragm, said body also having a pair of annular shoulders extending around it and facing each other, said shoulders forming the side walls of said channel, means to supply air under pressure to said air chamber to bulge outwardly said diaphragm, and a set of rings fittable one at a time into said channel to increase the diameter of said body, said rings differing in their external diameters.

BENNETT SVIRSKY.